(No Model.) 3 Sheets—Sheet 1.
G. H. MOORE.
COLLECTING TUBE FOR FILTERS.
No. 493,937. Patented Mar. 21, 1893.
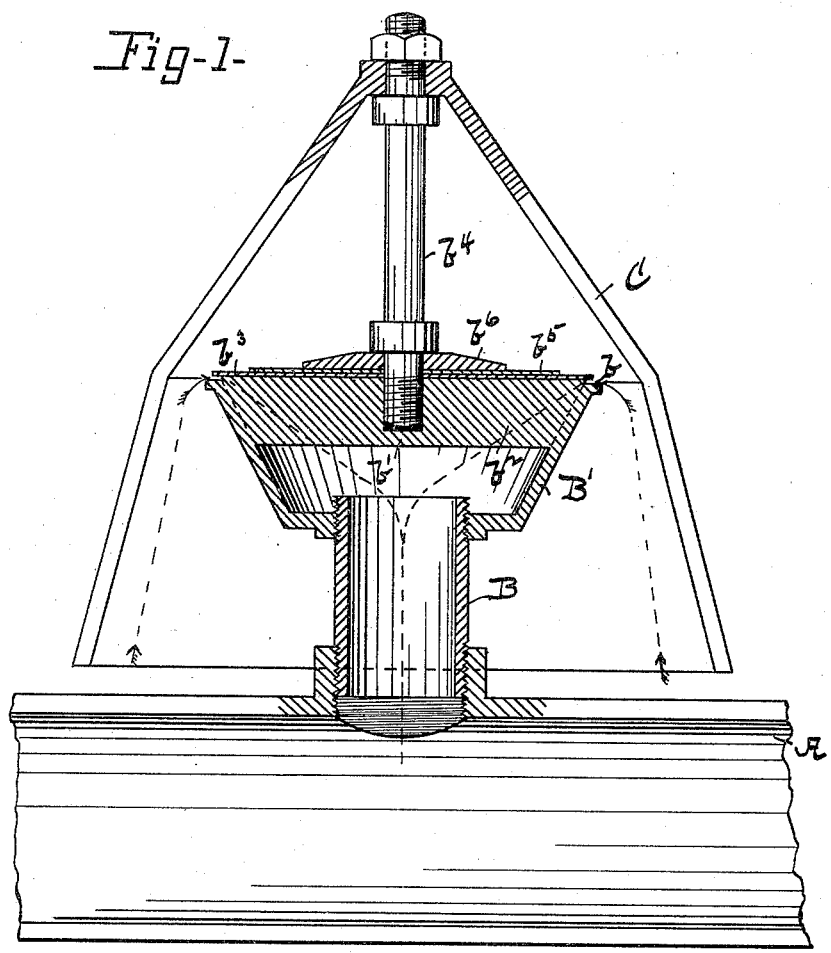
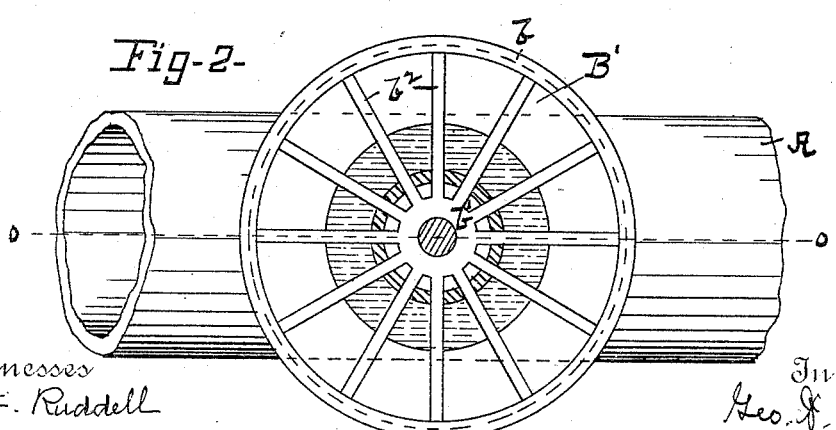
Witnesses
Robt. Ruddell
J. E. Chapman
Inventor
Geo. H. Moore
By Hawes Chapman
Attorneys (No Model.) 3 Sheets—Sheet 2.
G. H. MOORE.
COLLECTING TUBE FOR FILTERS.
No. 493,937. Patented Mar. 21, 1893.
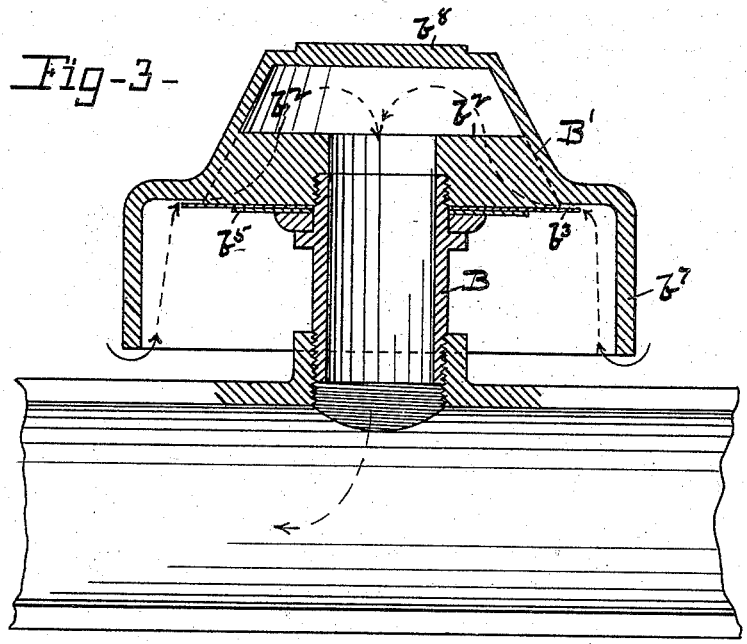
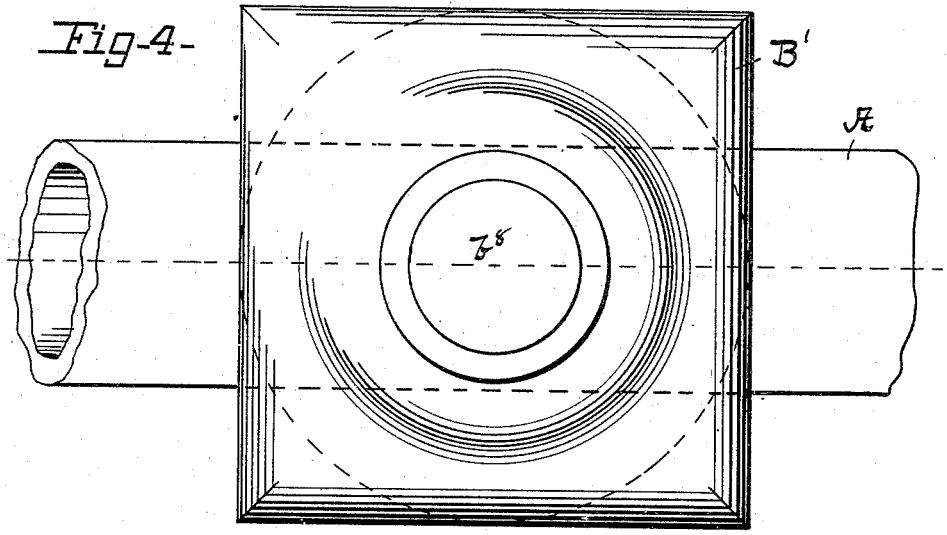

(No Model.) 3 Sheets—Sheet 3.
G. H. MOORE.
COLLECTING TUBE FOR FILTERS.
No. 493,937. Patented Mar. 21, 1893.
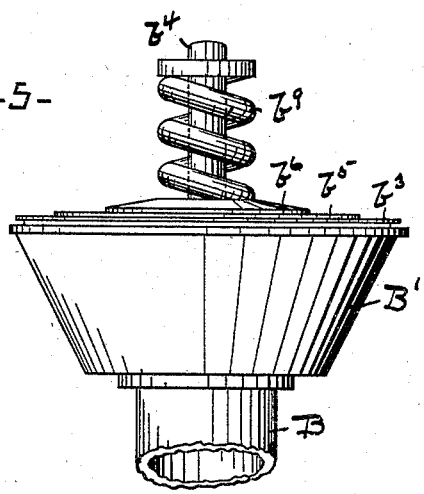
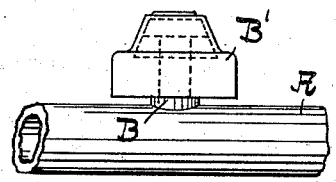
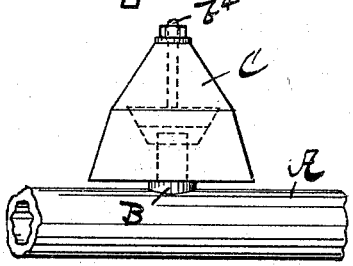
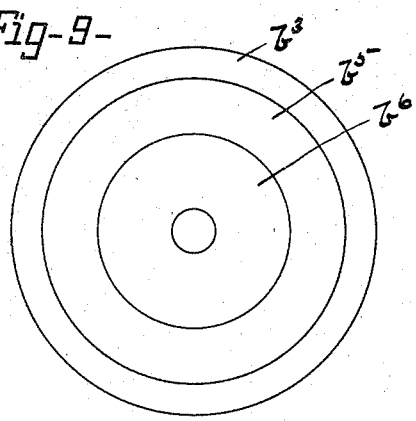
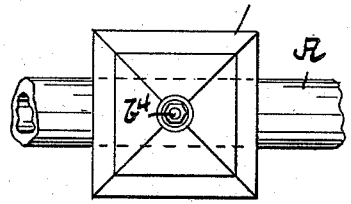
Witnesses
Robt. Ruddell
J. E. Chapman
Inventor
Geo. H. Moore
By James Chapman
Attorneys.

UNITED STATES PATENT OFFICE.

GEORGE H. MOORE, OF NORWICH, CONNECTICUT.

COLLECTING-TUBE FOR FILTERS.

SPECIFICATION forming part of Letters Patent No. 493,937, dated March 21, 1893.

Application filed March 22, 1892. Serial No. 426,009. (No model.)

*To all whom it may concern:*

Be it known that I, GEORGE H. MOORE, of Norwich, in the county of New London and State of Connecticut, have invented a new and useful Improvement in Collecting-Tubes for Filters, of which the following is a specification, reference being had to the accompanying drawings, forming part thereof.

My invention relates to the tubes or passage-ways through which, during the process of filtration, the filtered water is conducted from the filtering chamber or compartment containing the filtering medium, to a separate compartment of the filter, or into pipes suitably disposed to enable them to collect the filtered water and direct it to the service pipe or pipes; and through which tubes or passage-ways also, the reverse current of water is conducted into the filtering chamber for the purpose of cleaning the filtering medium when the latter becomes clogged by the matter eliminated from the water during filtration.

The object of my invention is to provide a tube for this purpose which, without the use of a screen of perforated metal or wire gauze such as is usually employed, will afford a free water-way for the filtered water, while preventing the entrance thereto of the particles composing the filtering material; and which will automatically provide a greatly increased water-way for the cleansing water during the operation of washing by a reverse current.

To this end, my invention consists in a collecting tube having applied to its mouth a flexible or yielding covering device, so arranged as to normally obstruct the entrance to the tube of the particles composing the filtering material while permitting the filtered water to freely enter the same, and which, by yielding to the pressure exerted by the reverse current of water during the washing operation, affords a much greater water-way for the latter, all as hereinafter fully described and particularly pointed out in the claims.

Referring to the drawings, in which like letters designate like parts in the several views, Figure 1 is a vertical section of a pipe and of a collecting tube constructed according to my invention, applied thereto, taken upon line o—o of Fig. 2. Fig. 2 is a plan view of the mouthpiece of the tube, with the covering device removed. Fig. 3 is a vertical section, and Fig. 4 a plan, of a slightly modified form of the invention. Fig. 5 is a side elevation of still another modification. Fig. 6 is a side elevation, on a smaller scale, of the form shown in Fig. 1. Fig. 7 is a plan view thereof. Fig. 8 is an elevation of the form shown in Fig. 3. Fig. 9 is a plan view of the series of disks which are shown in Figs. 1 and 3.

The letter A designates one of the series of communicating pipes usually disposed horizontally at the bottom of the filtering chamber, for conducting the filtered water to the service pipe or pipes, in such filters as do not have a false bottom separating the said chamber from a water-receiving compartment.

The letter B designates the collecting tube, a series of which are screwed into said pipes A as herein shown, or into the false bottom when one is used, and which extend upwardly into the mass of comminuted filtering material and form the passage-ways for filtered water from the filtering chamber to the pipes A or the water-receiving compartment, and for cleansing water from the latter to said chamber. In constructing said tube according to my invention, I prefer to provide it with a flaring or cup-shaped mouthpiece B', which may be screwed thereon as shown or otherwise firmly secured thereto, and which mouthpiece preferably terminates at its large end in an annular flange *b*. At said large end also, the mouthpiece is provided with central hub *b'* and a series of radially disposed ribs $b^2$, the outer plane surface of which hub and ribs projects slightly, say one thirty-second of an inch, beyond the outer surface of flange *b*, as clearly shown in Fig. 1, and for a purpose which will be presently described. The yielding covering device for the tube and its mouthpiece is preferably composed of a disk of thin metal, such as sheet brass, designated by the letter $b^3$ in Figs. 1 and 9, which rests evenly upon the plane outer surface of the hub and ribs of the mouthpiece, and is preferably of such diameter that its periphery projects beyond the ends of said ribs a distance equal to about one-half the width of flange *b*, as shown in Figs. 1 and 2, in the latter of which a broken line indicates the circumferential line of the disk. The disk $b^3$ will preferably be held upon the mouthpiece by a threaded bolt $b^4$ entering a tapped hole in the hub $b'$ and having a suitable head or shoulder bearing upon the disk. When thus held upon the mouthpiece, it will be observed, an open waterway exists between each of the ribs $b^2$, at the periphery of the disk, the depth of which waterway will correspond to the distance to which the ribs project beyond the plane of flange $b$, and which, as previously stated, will preferably be about one thirty-second of an inch. It will be impossible for the particles of filtering material, such as is ordinarily used, to pass through this shallow water-way and enter the tube, while, on the other hand, the filtered water will pass freely therethrough, and, the length of the water-way being substantially that of the circumference of the disk and mouthpiece, it will be seen that a very great capacity for rapidly discharging the filtered water is afforded thereby. I am thus enabled to entirely dispense with the screens of woven wire or perforated metal such as have been generally used heretofore, and which are objectionable because of their liability to soon wear out and to become clogged in such manner as to greatly impede the operation of the filter. A very important feature in the operation of the disk $b^3$, moreover, lies in the fact that it automatically enlarges the water-way during the washing operation by means of a reverse current of water, said current, by its pressure against the disk, causing it to yield or spring upwardly at its edge, thus more than doubling the size of the water-way and enabling the washing operation to be very quickly performed. Here again a great advantage over the use of screens is gained, inasmuch as it enables me to use unfiltered water as the washing medium, any fibrous or other matter contained in which will pass freely through the enlarged water-way into the chamber and pass off through the waste-pipe, instead of being caught by said screens and clogging their perforations as heretofore.

In most instances I prefer to reinforce the action of disk $b^3$ by additional disks of varying diameters, as shown at $b^5$ $b^6$ Figs. 1 and 9, the number of which can be varied to secure the desired stiffness in their combined action.

The number of ribs $b^2$ at the outer end of the mouthpiece can also be varied at will, it being essential merely that the distance between their outer ends shall be such as to prevent the periphery of the disk from being forced between them by the pressure acting on the filtered water and the filtering material, in such manner as to partially obstruct the water-way.

For the purpose of relieving the disk as much as possible from the pressure of the filtering material, I prefer to employ in connection therewith a hood or guard C, which, as shown, is substantially pyramidal in shape and which may be supported by legs or standards at the bottom, but which will preferably be supported by extending bolt $b^4$ through the top of said guard and providing a shoulder and nut on said bolt, as shown in Fig. 1, to securely hold the guard in position, with its lower edge slightly elevated above the level of pipe A. Said hood or guard C, when thus disposed, entirely relieves disk $b^3$ from the weight of the filtering material without affecting the capacity of the tube to discharge filtered water, which latter passes beneath the bottom of the guard and upwardly within the same to the tube, as indicated by the arrows in Fig. 1. During the washing operation, the cleansing water moves in the reverse direction and issues from beneath the guard C, at the extreme bottom of the mass of filtering material, thus insuring the thorough agitation and washing of the entire mass.

In Figs. 3 and 4 I have shown a slightly modified form of the invention, in which the mouthpiece B' is inverted and is provided at its periphery with a depending, annular flange $b^7$. The top of the mouthpiece at $b^8$ is closed, and the disk $b^3$ is held between a flange on the collecting tube B and the outer surface of hub $b'$ and ribs $b^2$. As shown in Figs. 3, 4 and 8, the lower portion of the mouthpiece is rectangular, but if desired it can be made circular, as indicated by the broken line in Fig. 4. The operation of this form of the device is similar to that previously described, the course taken by the filtered water being indicated by arrows in Fig. 3. Inasmuch as the weight of the filtering material is taken from the disk by the mouthpiece itself, the guard C is omitted with this form of the invention.

In Fig. 5 is shown another modification, in which a non-elastic disk is employed in connection with a coil spring $b^9$ mounted upon bolt $b^4$, between the disk and a flange or collar on said bolt, whereby the spring will exert a constant pressure upon the disk. If preferred the spring could be located within the mouthpiece and connected with the disk in such manner as to exert a drawing instead of a pushing action upon the latter. The disk in this instance operates in the same manner as that before described, except that instead of being forced upwardly at its periphery merely by the cleansing water, it is raised bodily against the stress of the spring. This form of the device can also be used in an inverted position, as shown in Figs. 3 and 4, but, as coil springs are liable to lose their tension in time, I prefer to use either of the forms first described.

Other modifications of the invention will suggest themselves to persons skilled in the art. For example, it will be obvious that, with the thicker disk shown in Fig. 5 and the independent spring, a sufficient support for the disk would be provided by a flange on bolt $b^4$ and suitable projections on the face of the flange $b$ of the mouthpiece, to receive, respectively, the center and periphery of the disk and elevate the latter slightly above the plane of flange $b$, thus enabling the radial ribs $b^2$ to be dispensed with, their function in the first described forms being simply to afford a large supporting area for the disk, which is itself thin and elastic.

In all of the forms shown, it will be observed, the important and valuable feature of a collecting tube having an open water-way and having means for automatically enlarging said water-way during the washing operation, is preserved.

In an application filed by me on the 23d day of March, 1892, and serially numbered 426,049, I have shown, described and claimed a collecting tube for filters in which a flaring mouth-piece and flexible disk are employed, but in that case the outer surface of the central hub and radial ribs is depressed beneath the plane of the adjacent end of the mouth-piece, whereby the disk is caused to normally close the entrance to said mouth-piece, instead of leaving it normally open as in the present device.

Having thus fully described my invention, what I claim, and desire to secure by Letters Patent, is—

1. The collecting tube herein described having applied to its mouth a yielding, imperforate plate, which partially closes but does not entirely close said mouth, whereby an open water-way to said tube, capable of being automatically enlarged is provided, substantially as and for the purpose set forth.

2. The collecting tube for filters herein described having applied to its mouth a disk capable of yielding to pressure exerted thereon from the bore of said tube, and a stop or stops on said tube to prevent said disk from entirely closing the mouth thereof, substantially as and for the purpose set forth.

3. The collecting tube for filters herein described having at the mouth thereof a constantly open water-way, one side of which water-way is composed of a yielding, imperforate surface, whereby said water-way is adapted to be enlarged by pressure exerted against said surface, substantially as and for the purpose described.

4. The collecting tube herein described having at the mouth thereof an annular, plane surface, and having a yielding disk supported thereon adjacent to but separated from said plane surface, whereby a narrow water-way between said disk and surface is provided, substantially as and for the purpose set forth.

5. The combination with the collecting tube having a flaring mouthpiece and having a series of rests or supports projecting slightly beyond the end of said mouthpiece, of a yielding covering device connected to said mouthpiece and resting upon said supports, arranged and operating substantially as described.

6. The collecting tube for filters herein described, having a flaring mouthpiece terminating in an annular, plane surface and having at its outer end a central hub and radial ribs, the outer surface of which hub and ribs projects slightly beyond said annular, plane surface, combined with a flexible, imperforate diaphragm mounted upon the outer surface of said hub and ribs, and overlying a portion of said annular, plane surface, substantially as and for the purpose set forth.

7. The collecting tube for filters herein described, having a flaring mouthpiece terminating at its outer end in an annular, plane surface and having at the outer end of said mouthpiece a central hub and radially disposed ribs the outer surface of which projects slightly beyond the line of said plane surface, combined with a thin, metallic or other disk secured at its center to said central hub and covering said ribs, substantially as and for the purpose set forth.

8. The collecting tube B having mouthpiece B' and hub $b'$ and ribs $b^2$ projecting slightly beyond the end of said mouthpiece, combined with a plurality of disks of spring-metal, superposed upon each other and secured to said mouthpiece by a bolt passing centrally through said disks into said hub $b'$, substantially as and for the purpose described.

9. The combination with tube B having mouthpiece B' and having disk $b^3$ partially closing said mouthpiece, of a hood or guard, as C, inclosing said tube and having an open waterway beneath its base and between its inner surface and said mouthpiece, substantially as and for the purpose described.

10. The combination with pipe A, of tube B leading therefrom, said tube having mouthpiece B' at its upper end, central hub $b'$ and radial ribs $b^2$ arranged within said mouthpiece and projecting slightly beyond the end of the same, disk $b^3$, bolt $b^4$ passing centrally through said disk into said hub, and hood C mounted at its upper end upon said bolt, arranged and operating substantially as described.

GEORGE H. MOORE.

Witnesses:
W. H. CHAPMAN,
J. E. CHAPMAN.